(12) United States Patent
Dron

(10) Patent No.: US 11,991,992 B2
(45) Date of Patent: May 28, 2024

(54) METHOD FOR PREVENTING ESCAPING OF BEES FROM A HIVE AND DEVICE FOR IMPLEMENTING SAME

(71) Applicant: Iurii Silvestrovych Dron, Chernivtsi (UA)

(72) Inventor: Iurii Silvestrovych Dron, Chernivtsi (UA)

( * ) Notice: Subject to any disclaimer, the term of this patent is extended or adjusted under 35 U.S.C. 154(b) by 8 days.

(21) Appl. No.: 17/635,071

(22) PCT Filed: Jul. 13, 2020

(86) PCT No.: PCT/UA2020/000067
§ 371 (c)(1),
(2) Date: Nov. 9, 2022

(87) PCT Pub. No.: WO2021/034296
PCT Pub. Date: Feb. 25, 2021

(65) Prior Publication Data
US 2023/0130151 A1 Apr. 27, 2023

(30) Foreign Application Priority Data
Aug. 19, 2019 (UA) ................. a 2019 09418

(51) Int. Cl.
*A01K 47/06* (2006.01)
*A01K 57/00* (2006.01)

(52) U.S. Cl.
CPC ............. *A01K 47/06* (2013.01); *A01K 57/00* (2013.01)

(58) Field of Classification Search
CPC ........ A01K 47/06; A01K 57/00; A01K 47/00; A01K 47/02

USPC ............................................. 449/2
See application file for complete search history.

(56) References Cited

U.S. PATENT DOCUMENTS

| 2,232,343 | A | * | 2/1941 | Sauter | G05D 23/024 236/49.5 |
| 3,200,419 | A | * | 8/1965 | Root | A01K 47/06 449/2 |
| 2017/0208779 | A1 | * | 7/2017 | Rubright | A01K 51/00 |

FOREIGN PATENT DOCUMENTS

| CN | 203040408 U | 7/2013 |
| ES | 1224080 U | 1/2019 |
| RU | 2411723 C1 | 2/2011 |
| UA | 133650 U | 4/2019 |

OTHER PUBLICATIONS

International Preliminary Report on Patentability for PCT/UA2020/000067, English translation, 8 pages.

* cited by examiner

*Primary Examiner* — Brady W Frazier
*Assistant Examiner* — Zoe Tam Tran
(74) *Attorney, Agent, or Firm* — Luedeka Neely, P.C.

(57) ABSTRACT

A method to inhibit bees from escaping a hive through a hive entrance, including the steps of providing a source for cooling air, and operating the source for cooling air to provide air cooling at the hive entrance to a temperature below 14° C. to provide thermal conditions at the hive entrance that inhibit bees from leaving the hive through the hive entrance.

5 Claims, 2 Drawing Sheets

Figure 1:
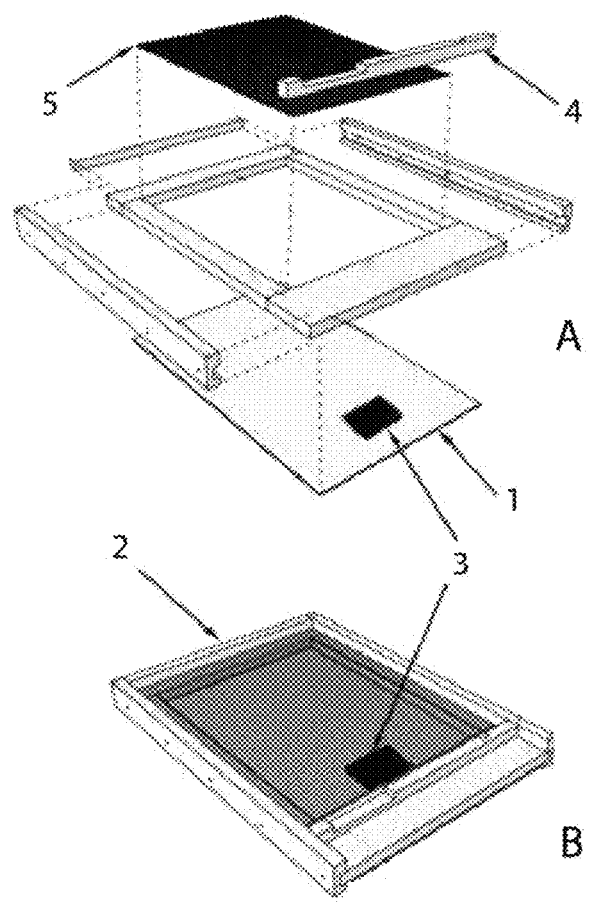

METHOD FOR PREVENTING ESCAPING OF BEES FROM A HIVE AND DEVICE FOR IMPLEMENTING SAME

The invention relates to beekeeping, namely to the methods and means of bee colonies management.

Mass poisoning of beneficial insects such as honey bees, owing to use pesticides in the cultivation of crops, is a very urgent environmental problem nowadays. Most of plant protecting products are toxic and dangerous to bees, especially at the moment of application and for a certain period after application. When the crops are chemically treated, the beekeepers are forced out to remove the apiary to the other agricultural lands or briefly close the bees in the hives, for keeping the bee colonies safe.

All known methods of locking the bees up in the hive require the mechanical covering of the hive entrances by different stoppers which causes enormous stress in the bee colony. At this time, the bees are getting excited and intensively and disorderly move evolving a large amount of heat and carbon dioxide. Heat and a significant content of carbon dioxide cause instinctive evaporation of moisture and strong wings airing, which further warms up the hive. Owing to weak air exchange with environment, high internal temperature or high population, the bee colony overheats very quickly and perishes (worn out).

For the prevention of worn out, beekeepers are forced to use additional tools and measures to upgrade ventilation of the hive, for example, bottom board and crown nets, extra housings, shading, displacement of housings and roofs, etc. Such measures are redundant and cost-intensive, although with timely and effective application they usually give the possibility to save the bee colony. However, prolonged heating of the hive and its subsequent intensive airing leads to consumption of large amounts of honey and significant wear and tear of bees.

Regardless of the fact that transportation of bees is carried out mainly at night at reduced temperatures, lack of temperature control in the hive and failure of its effective regulation, all too often causes evolving of the processes described above, which sometimes also lead the bee colonies to be worn out.

There are many procedures and appliances for monitoring and regulating the climate in a beehive. In particular, the patent of Ukraine No. 133650 describes a remote monitoring system of various parameters of the beehives in an apiary built on the basis of the wireless data transmission on the standards Wi-Fi/GSM/LPWAN.

Prior art solutions for regulating air temperature in the beehives were focused mainly on its heating. Thus, in application US2017/0208779, it is proposed to the Peltier thermoelectric module for air heating and in one of the variants of application US2007/0218804, it is proposed to use it in heating incubator of solitary bees.

In the invention RU2395197, which by structural features is the closest prototype of the set forth appliance in the invention, the Peltier thermoelectric module also heats air for heat treatment of bee colonies.

Patent RU2411723 proposes a system for a full control of the microclimate of the beehive, where the thermoelectric Peltier module is used to cool the hive space. In monograph of one of the patent's authors (A. F. Rybochkin, Improvement of efficiency of the apiary using an electric heating of the bee colonies: monograph, Kursk, South Western State University, 2012, p. 351), test model of such a hive is described, where it is indicated that the thermoelectric cooler is fixed in its upper lid, so that with an eye on switching on, the cold air, produced by it, descends into the bee's nest and cools it. Such an arrangement of the Peltier thermoelectric module makes it impossible to cool air in the bottom board part of the beehive near an entrance without cooling the entire volume of the hive, although in the beehive with a bee brood, the temperature should not fall below 35° C.

In all the other major sources, for cooling a beehive, its ventilation and/or humidification are being intensified. It seems clear that on a hot summer day, it is impossible to cool the air in an entrance space to a level below 14° C. by this way.

The core of invention is based on the task to prevent the flight of the bees from the hive without causing any damage to the bee colony.

The task is solved in a way to prevent escaping the bees from the hive limiting their ability to go through the hive entrance by cooling the air in an entrance space to a level below 14° C. using the Peltier thermoelectric module. The bees consider it as a natural fall of temperature and refuse to fly from the hive, because flight activities of the bees occur only at temperature above 14° C.

Figure 2:
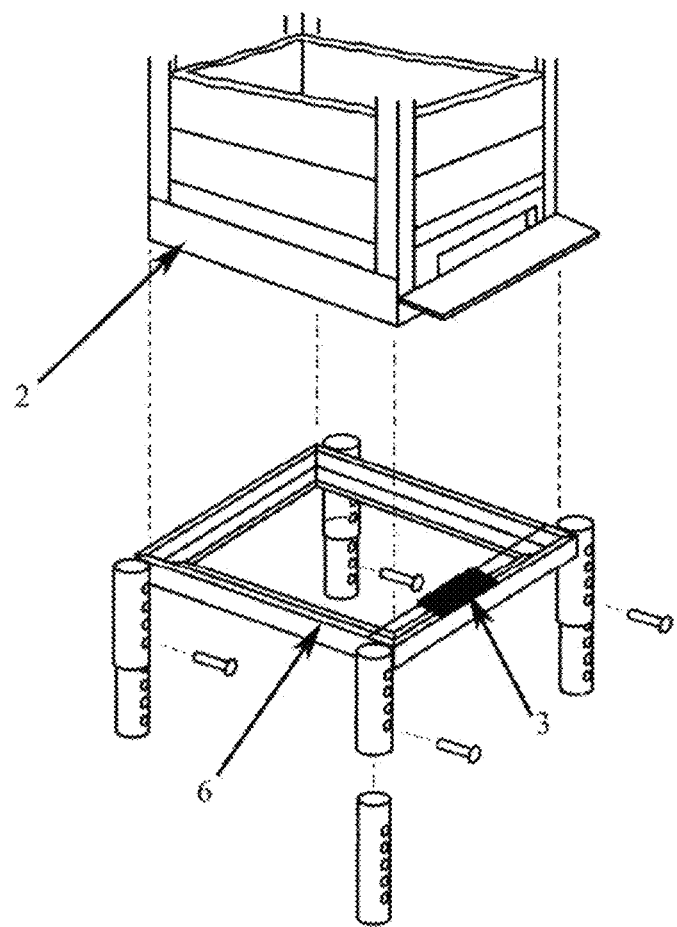

FIG. 1 presents the typical wired bottom board of the world's most common Langstroth hive in disassembled (A) and assembled (B) condition and its schematic arrangement in removable frame equipped with radiators of the Peltier thermoelectric module. FIG. 2 generally presents the possible arrangement of the Peltier thermoelectric module on the hive's stand.

Practical realization of the claimed method in the simplest case is performed in the following way: in the removable frame 1 (FIG. 1) of the bottom board 2 of the beehive the Peltier thermoelectric module 3 with the radiators on both sides is mounted such, that the surface of its upper radiator should be placed directly under the hive entrance formed by the entrance reducer 4 and the mesh 5, and is connected through a thermal controller with sensors with an electric power source (battery, solar panel, electric mains, generator, etc.). Power of the Peltier thermoelectric module 3 and its feeding current rate, as well as thermal controller settings, are selected that the air near the hive entrance is cooled below 14° C. The bee colony considers it as a natural fall of temperature, stops its flight activities, and goes to the prudent use of food stores in the hive.

When fixing the Peltier thermoelectric module 3 on the metal part of the stand or support structure 6 (FIG. 2), which acts as a lower radiator in this case, it is necessary for the upper radiator should contact with the internal hive entrance space. Thermal controller equipped with a sensor bank regulates the power supply of the Peltier thermoelectric module in such a way that air near a hive entrance is cooled below 14° C.

Similarly, the claimed appliance operates during transportation of the bee colonies. However, in respect that the bees are extra excited due to thumbs and the possibility of blowing out the cooled air through the hive entrance, it is advisable to cool air to 10-12° C. during transportation.

That temperature (below 10-12° C.) significantly slows down the development of wax moths. For protecting the honeycombs against eradication by these vermin they should be removed from the bee colonies and folded in boxes in several tiers in a cool room. Then the bottom board or removable frame of the bottom board with the cooling appliance should be installed above them and the cooler should be plugged in to cool air in boxes with honeycomb to temperatures below 10-12° C.

In the autumn-winter period, the bee colony consumes honey for heating and releases a significant amount of water vapor. Heating the air in the hive bottom board to a temperature of 3-5° C. can significantly reduce honey consumption and the release of harmful moisture. If the temperature rises to 8-10° C., the winter cluster is destroyed and feed consumption increases sharply. Besides, the temperature elevation can cause the appearance of early brood which requires constant intensive heating and often to bee colony collapse in winter. Thus, in the autumn-winter period, it is advisable to maintain the temperature in the bottom board of the hive at the level of 3-5° C., programming the thermal controller of the claimed appliance for two-way work on heating-cooling by changing the direction of current flow through the Peltier thermoelectric module.

As a rule, at the end of winter in the center of the bee cluster, the temperature rises to 35° C. and brood-rearing begins. Additional air heating at this time can significantly reduce feed consumption and stimulate the development of the colony. In order not to cause flying out the bees from the hive at low external temperatures, heating in the bottom board of the hive during daylight hours should be carried out no higher than 12-14° C. and provide the bees with water using an intra-hive drinking bowl.

During honey harvesting, the bees are forced to evaporate excessive amounts of moisture from the nectar by intensive ventilation airing. That is why heating the air at this time, especially at night, up to 35° C. can significantly increase the intensity of honey aging and significantly reduce the wear and tear of bees at the same time.

It is possible to improve the health of bees and free them from parasites by heating the hive to a temperature within 38-42° C. for a certain period of time, as proposed in patents RU2395197, U.S. Pat. Nos. 9,363,984, 9,999,204 and in application WO2015/087198. Thermal sensors must be installed in the brood part of the beehive.

Claimed appliance operates in standalone mode, still, with the help of wired communication modules or wireless data transmission according to Wi-Fi/GSM/LPWAN/Bluetooth similar to UA No 133650, it is possible to control the operation of appliances locally or remotely from electronic digital devices and change the mode of their operation.

The claimed method and appliances can be implemented using existing tools and technologies.

The invention claimed is:

1. A method to inhibit bees from escaping a hive through a hive entrance, comprising the steps of: providing a source for cooling air, and operating the source for cooling air to provide air cooling at the hive entrance to a temperature below 14° C. to provide thermal conditions at the hive entrance that inhibit bees from leaving the hive through the hive entrance.

2. An appliance to prevent bees from escaping a hive, whereas the improvement comprises a thermoelectric module with radiators located directly at a hive entrance, the thermoelectric module being connected to an electric power source and operated to cool air at the hive entrance to a temperature below 14° C.

3. The appliance according to the claim 2, further comprising locating the thermoelectric module directly below the hive entrance on a metal surface of a supporting stationary or movable stand on which the hive is supported.

4. The appliance according to the claim 2, further comprising a programmable thermal controller operably associated with the thermoelectric module for remotely controlling operation of the thermoelectric module.

5. A method to inhibit bees from escaping a bee hive having a bee entrance location, comprising the steps of:
  locating a source for cool air proximate the bee entrance location of the bee hive; and
  operating the source for cool air to maintain air within the bee hive proximate the entrance location of the bee hive at a temperature below about 14° C.

* * * * *